Jan. 6, 1942.　　　C. W. CRUMRINE　　　2,269,183
CUT FILM BACK FOR CAMERAS
Filed April 8, 1941　　　3 Sheets-Sheet 1

CHESTER W. CRUMRINE
INVENTOR

BY
ATTORNEYS

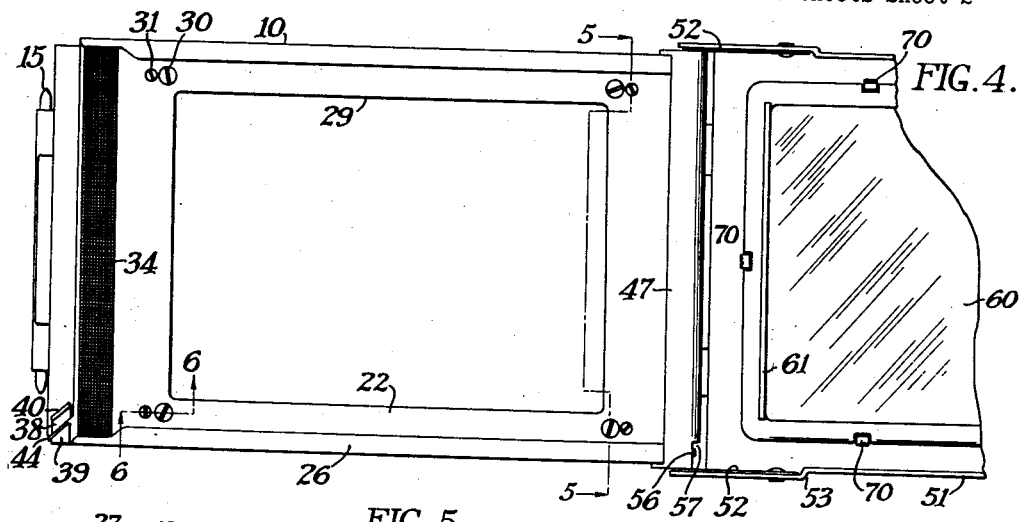

Jan. 6, 1942.　　　　C. W. CRUMRINE　　　　2,269,183
CUT FILM BACK FOR CAMERAS
Filed April 8, 1941　　　3 Sheets-Sheet 3
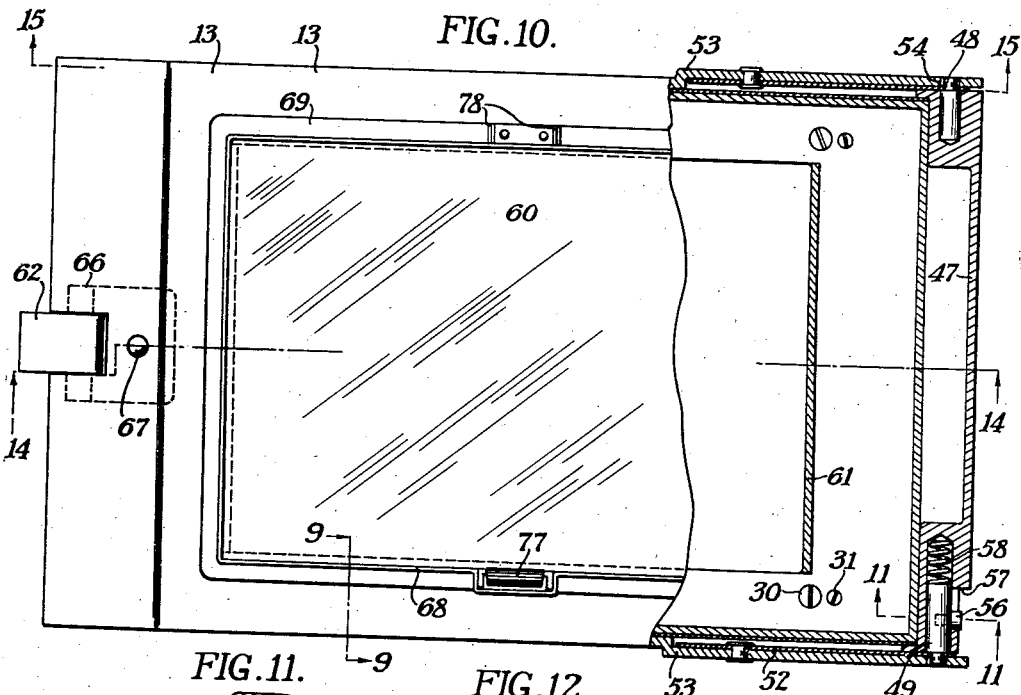
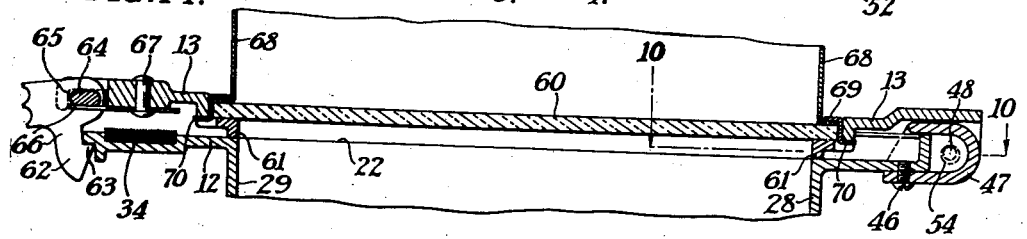
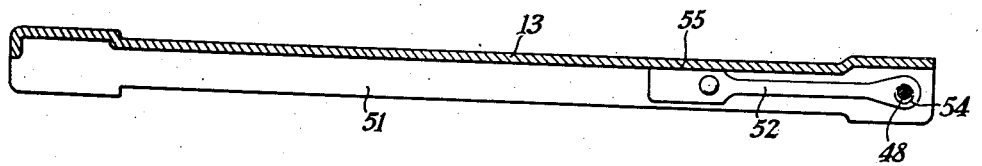
CHESTER W. CRUMRINE
INVENTOR
BY
ATTORNEYS

UNITED STATES PATENT OFFICE 2,269,183

CUT FILM BACK FOR CAMERAS

Chester W. Crumrine, Rochester, N. Y., assignor to Eastman Kodak Company, Rochester, N. Y., a corporation of New Jersey Application April 8, 1941, Serial No. 387,392

10 Claims. (Cl. 95—66)

The present invention relates to photography, and particularly to a cut film back for a roll film camera.

One object of the present invention is to provide a cut film back which can be readily, detachably mounted on the back of a camera body in place of a roll film back to permit cut film to be used in the camera in place of roll film.

Another object is to provide a cut film back of the type set forth which includes a frame into which a cut film holder, or film pack, can be inserted, and which frame includes a spacer element which is adapted to engage bearing surfaces in the camera body proper to correctly position the frame with respect to the focal plane of the camera.

And another object is to provide a cut film back of the type set forth in which the frame of the cut film holder is adjustably mounted relative to the body portion of the back along the optical axis, whereby the two parts can be relatively adjusted to insure a light-tight connection between the body portion of the back and the camera body when the spacer element of the frame engages said bearing surfaces in the camera body.

And still another object is to provide a cut film back of the type set forth which includes a focusing ground glass preferably hinged thereto to move to and from a focusing position, and which ground glass is carried by a support including a spacer element which is adapted to engage the cut film holder locating surface of said frame to properly position the ground glass in the focal plane of the camera.

And yet another object is to provide means for latching said ground glass support to said frame in a focusing position, the latching means and the hinge means for the ground glass support being resilient for the dual purpose of permitting the ground glass support to be hinged to a focusing position despite the fact that the spacer element engages the frame adjacent the hinge before the support is in a full focusing position, and provides means for normally forcing the ground glass support toward the frame along the optical axis to insure the spacer element on the support being in engagement with the locating surface of the frame.

A still further object is to provide a cut film back of the type set forth on which the frame which serves to definitely locate the film pack and ground glass in proper focal plane is adjustable relative to the body portion of the back so that allowable tolerances in the fabrication of camera bodies and body portions of the back can be readily accounted for, thus making it possible to die cast these parts instead of machining them to a given fit.

The novel features that I consider characteristic of my invention are set forth with particularity in the appended claims. The invention itself, however, both as to its organization and its methods of operation, together with additional objects and advantages thereof, will best be understood from the following description of the specific embodiments when read in connection with the accompanying drawings in which, Fig. 1 is a top plan view of a camera with a cut film back constructed in accordance with the preferred embodiment of the present invention mounted on the back thereof, and showing said back in a closed condition.

Fig. 4 is a rear elevational view of the back with the focusing ground glass swung to an open position, Fig. 5 is a sectional view taken substantially on line 5—5 of Fig. 4.

Fig. 6 is a sectional view taken substantially on line 6—6 of Fig. 4.

Figure 1:
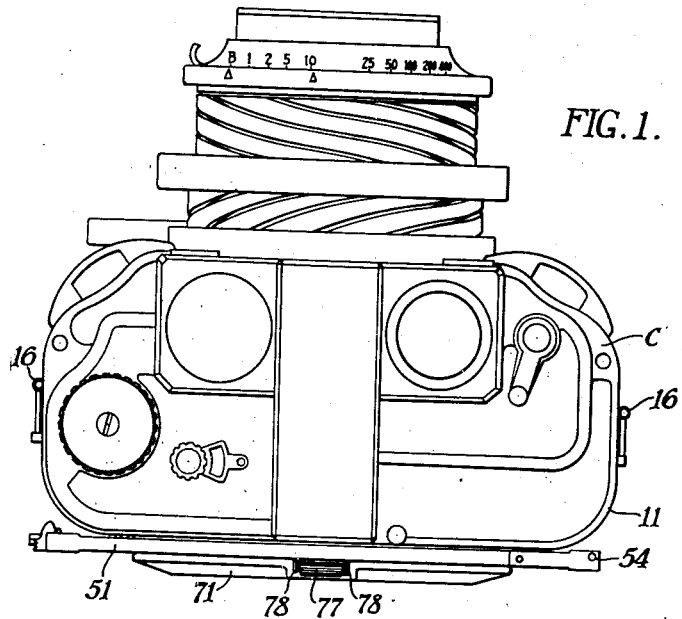

Fig. 7 is an enlarged detail view of one corner of the back with the focusing ground glass removed, and showing the latch for rigidly holding the film pack in position in the back, Fig. 8 is a side elevation of the detail shown in Fig. 7, Fig. 9 is a section taken substantially on line 9—9 of Fig. 10, showing the manner of mounting the ground glass on the collapsible focusing hood therefor to the ground glass support.

Fig. 10 is a rear view of the back, partly in section, taken substantially on line 10—10 of Fig. 14, and partly in elevation, showing the back with the ground glass focusing hood raised; and showing the manner of detachably hinging the ground glass support to the back proper, Fig. 11 is a section taken substantially on line 11—11 of Fig. 10, Fig. 12 is an elevational detail of the retractable hinge pintle shown in section in Fig. 11, Fig. 13 is an elevational view of one of the flexible hinge arms for the focusing ground glass support, Fig. 14 is a section taken substantially on line 14—14 of Fig. 10, Fig. 15 is a section taken substantially on line 15—15 of Fig. 10.

Like reference characters refer to corresponding parts throughout the drawings.

Figure 3:
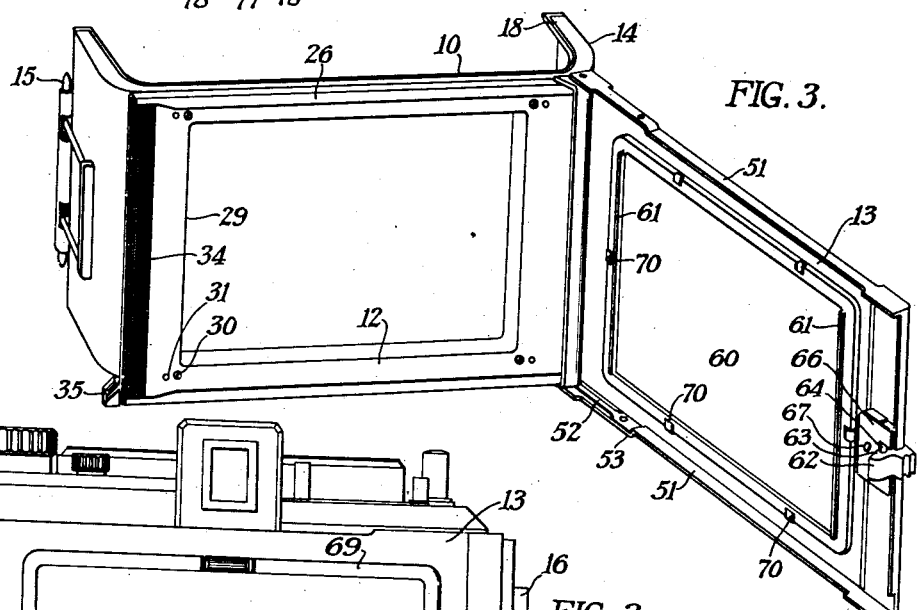
Fig. 3 is a rear perspective view of the cut film back removed from the camera, showing the focusing ground glass, constituting a part of the back, swung to an open position.
Figure 2:
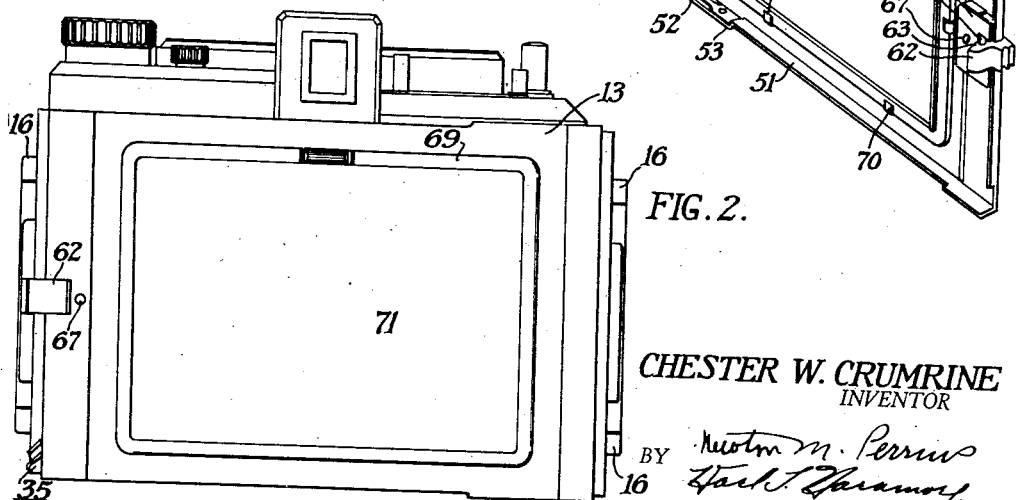
Fig. 2 is a rear elevational view of the camera shown in Fig. 1.

Referring to the drawings, and particularly to Figs. 1-3, the cut film back, indicated generally by the numeral 10, includes a body portion 11, a cut film frame 12 attached thereto, and a ground glass support 13 hinged to the frame 12. The body portion 11 of the back has side wall portions 14 which form a part of the side walls of the camera C when the back is mounted on the rear of the camera in place of the usual roll film back with which the camera comes supplied. The back is provided with retractable hinged pintles 15 at each end which are adapted to engage hinge pintle sockets 16 on the camera body when the back is attached thereto. The edges of the camera body may be grooved or recessed, as shown at 17 in Fig. 5, to receive inturned flanges 18 around the edge of the body portion of the back to provide a light-tight connection between the camera body and the cut-film back when the two parts are connected as shown in Fig. 1.

Referring particularly to Fig. 5, adjacent the rear end of the camera body is an exposure frame 19 across which the roll film is adapted to be fed in the focal plane of the camera objective and into position in alignment with an exposure aperture 20 surrounded by the frame. For cooperating with the cut film back constituting the present invention, the inner edges of the exposure frame 19 may be accurately machined to provide bearing surfaces 21 having a definite relation to the focal plane of the camera for the purpose which will be fully set out hereinafter. The frame 12 of the cut film back comprises a locating surface 22 against which the base of the film pack 23 is adapted to rest, and is provided with upstanding flanges 24 around its outside edge on three sides to guide the edges of the film pack when slid into or out of the frame as is well known. A channel strip 25, fastened to the under side of the frame by screws 25', extends longitudinally of the two longitudinal edges of the frame, and one arm 26 thereof overhangs the locating surface of the frame to extend into a notch 27 found in the side of well-known film packs. The arm 26 of the channel strips cooperates with the frame 12 to form guideways to facilitate sliding the film pack into, and out of, the frame; and the arm 26 of the channel strip is resilient and deformed toward the locating surface of the frame so that the film pack is firmly pressed against the locating surface of the frame thereby.

It will be readily understood by those skilled in the art that the cut film back must be so constructed that it will locate the film pack in a given plane relative to the focal plane of the camera each time it is placed on the camera so that any focusing scale or mechanism provided for use with cut film will give true readings when adjusted in accordance with a focal plane for cut film. In order to do this, the locating surface of the frame, which determines the position of the film pack relative to the focal plane of the camera, must be accurately located relative to the focal plane of the camera when the cut film back is placed thereon. To this end, the frame 12 is provided with a spacer element 28 which surrounds the exposure aperture 29 in the frame, which is the same size as the exposure aperture 20 in the camera body, and the ends of which spacing element are adapted to rest against the bearing surfaces 21 in the camera body when the cut film back is attached thereto. This spacer element 28 is accurately machined to a given length so that the locating surface 22 of the frame will be located the desired distance from the focal plane of the camera when the ends of the element rest on the accurately formed bearing surfaces 21.

In order to reduce the cost of manufacture, camera bodies and these main parts of cut film backs are die cast. Referring to Fig. 5, it will be appreciated by one skilled in the art that it would be practically impossible to die cast a frame and body portion of this cut film back in one piece and be sure that when the bottom of the spacer element 28 engaged the bearing surface 21 that the bottom of the inturned flange 18 on the body portion 11 of the back would seat in the light groove 17 around the edge of the camera back to provide a light-tight connection, or vice versa. To permit the camera body and the several parts of the cut film back to be die cast and to insure their proper cooperating when placed together, the frame and body portion of a cut film back are made as separate parts and adjustably connected together. This adjustable connection of the frame 12 and the body portion 11 constitutes an important feature of the present invention for the reasons which will now be set forth.

Referring particularly to Figs. 4 and 5, the frame 12 is made of rigid material which will sustain its plane surface satisfactorily. The frame is connected to the body portion at each of its four corners with pairs of holding screws 30 and locating screws 31 so that by adjusting these screws the angle and position of the frame 11 may be changed after the frame is connected to the body portion 12. In assembling the body portion and frame of a cut film back, the locating screws 31 are first threaded into the body portion 11 and then the frame 12 is set down upon the flanges 32 of the screws. The body portion 12 is then, or previously, attached to the camera body so that the inturned flanges 18 thereof seat in the light groove 17 in the edges of the camera body. Now the locating screws 31 are adjusted up or down until the end of the spacer element 28 of the frame supported by the flanges thereof just touches the bearing surfaces 21 of the camera body, being sure that the locating surface thereof lie in a horizontal plane, then the holding screws 30 are put in place to lock the frame in the adjusted position relative to the body portion. By means of this adjustable connection a proper engagement between the ends of the spacer element 28 and bearing surfaces 21, and the light-tight connection between the body portion and the camera, can be obtained regardless of the small tolerances in the fabrication of the several parts; and the locating surface of the frame will be definitely located in a given plane each time the cut film back is placed on the camera. It need hardly be pointed out that this is a factory adjustment which need be made only once on any one camera and back combination, and that the finishing of the bottom edge of the spacer element, to insure the element being proper length, is the only machine operation required of the fabricated pieces.

The film pack 23 is adapted to be slid into and out of the left-hand side of the frame 12, looking at Fig. 4, and a strip of velvet, felt, or other suitable material, 34 is placed across the open end of the frame to form a light-tight connection with a film pack when the same is in place in the frame. The lower left-hand corner of the open end of the frame, see Fig. 7, is provided with a releasable catch 35 which locks the film pack 23 in place in the frame. Referring particularly to Figs. 7 and 8, this catch includes an arm 36 pivoted at one end 37 to the under side of the frame, and the other end of the arm being substantially U-shaped and including two spaced arms 38 and 39 which are adapted to overhang opposite faces of the film pack when the same is fed into or out of the frame. The lower arm 38 includes an upstanding lug 40 which is adapted to snap behind the film pack after the same is slid into the frame to prevent it from being accidentally withdrawn. The end of the channel strip 25 overlying the latch is slit along one edge 41 to provide a resilient portion which normally moves the catch to its locking position. An upstanding lug 42 on the arm of the catch lies against the inside face of the resilient portion of the channel strip so that the normal position of the strip holds the catch in its locking position. Movement of the catch to its locking position is positively limited by the engagement of the base 43 of the U-shaped portion of the catch engaging the edge of a tapered projection 44 extending beyond the end of the frame.

Referring particularly to Figs. 10–15, onto the closed end of the frame 12 is attached by screws 46 a supplemental hinge bearing strip 47 which extends transversely of the frame. One end of this bearing strip includes a fixed hinge pintle 48, while the other end is recessed to receive a retractable hinge pintle 49. The ground glass support 13, including down-turned flanges 51 along its longitudinal sides, is adapted to be detachably hinged to the frame as shown. The hinge connection between the ground glass support and the frame includes a pair of separate hinge arms 52, see Fig. 13, one of them being riveted at one end in the offset portion 53 of each of the down-turned flanges 51 of the ground glass support. The free end of the hinge arms 52 is apertured to receive the ends of the hinge pintles 48 and 49. The ends of the hinge pintles are adapted to extend through the hinge arms 52 and through apertures 54 in the down-turned flanges 51 on the ground glass support, but the apertures 54 in the ground glass support are substantially larger than the hinge pintles so that the edges thereof are never directly engaged by the pintles for a reason which will be fully set forth hereinafter.

Referring to Figs. 13 and 15, it will be noticed that the hinge arms 52 are reduced in width between the fixed and free ends thereof. This reduction in width is to make the arms flexible and capable of deflection transversely of their length. It will be noticed that the fixed end of the hinged arm includes a relatively long straight bearing portion 55 which is adapted to engage the under side of the ground glass support. When it is desired to hingedly attach the ground glass support 13 onto the frame 12, one apertured hinge arm 52 is first slipped onto the end of the fixed hinge pintle 48, then the retractable hinge pintle is retracted by engaging the lug 56 projecting from the same into a cutout portion 57 of the hinged bearing strip and compressing the spring 58 normally forcing the same outwardly. After the other apertured hinge arm is slid into alignment with the retractable hinge pintle, the same is released and snaps through the aperture of the pintle. The ground glass support is then capable of being swung from the inoperative position shown in Figs. 3 and 4, to its operative focusing position shown in Figs. 9, 10, and 14.

When the ground glass support 13 is in its focusing position it is imperative that the ground glass 60 carried thereby be accurately located in the focal plane to be assumed by the film of the film pack. To this end, a pair of spacer elements 61 are attached, or otherwise provided, on the ground glass support, and extending transversely thereof to engage the locating surface of the frame when the ground glass support is moved to its focusing position on top the frame, see Fig. 14. These spacer elements are accurately finished as to depth so that the ground glass will be accurately positioned in the focal plane to be assumed by the film in the film pack. Looking at Fig. 14, it will be readily appreciated that when the ground glass support is swung to its closed position the spacer element 61 adjacent the hinge will strike the locating surface of the frame before the other spacer element strikes the locating surface. Therefore, to permit both spacer elements to be brought into engagement with the locating surface the hinge of the ground glass support must give slightly transversely of its length. It is to take care of this contingency that the particular hinge construction for the ground glass set forth is provided, the flexible hinge arms permitting the necessary transverse movement of the hinge point and thereafter resiliently urging the ground glass support toward the frame so that the spacer elements 61 thereon will be firmly held against the locating surface of the frame.

The free end of the ground glass support 13 is provided with a resilient catch for holding it in a closed position on top of the frame 12. Referring to Figs. 10 and 14, this catch includes a catch element 62 having a nose 63 adapted to overhang the end of the frame. This catch element includes a transversely extending non-circular pintle 64 which is held in a recess 65 in the under side of the ground glass support by a leaf spring 66 pinned to the support at 67. It will be appreciated that the particular resilient mounting of this catch element will insure the free end of the frame being resiliently forced toward the frame when in a latched condition, whereby the spacer element adjacent thereto will be constantly urged against the locating surface of the frame; and in addition the catch element will be resiliently urged either to its locked or unlocked position depending upon whether it is moved past a dead center position.

The ground glass 60 is surrounded by a collapsible focusing hood 68 made of leather or other suitable material. Both the ground glass and the hood are attached to the ground glass support by a bezel frame 69 which includes spaced lugs 70 adapted to extend through apertures in the support and be turned over as shown in Figs. 3 and 9. The cover 71 of the focusing hood 68 is made substantially rigid and is adapted to be automatically raised when released from a locked position in which it is folded. Referring to Fig. 9, the cover of the focusing hood may comprise a piece of heavy cardboard 72, or other suitable material, faced with cloth, or other suitable material, 73. The cover is adapted to be normally raised by a spring 74, the opposite ends 75 of which extend along the opposite ends of the cover between the cardboard and cloth, the intermediate portion 76 of the spring being turned back and held under the bezel frame 69. The normal raising effect of the spring is obtained by placing that portion of the same between the ends and intermediate portions thereof, held under the bezel frame, under torsion. The hood is adapted to be held in a collapsed position when a latch member 77 at one edge of the cover is snapped between a pair of resilient fingers 78 on the bezel frame 69, see Figs. 3 and 10.

From the above description it will be readily appreciated that the cut film back constituting the present invention is designed so as to permit methods of fabrication of the several parts involving tolerances, but which tolerances can be overcome by individual adjustment of the parts going to make up the back so that the film pack locating surface and ground glass will assume given planes when the back is placed on the camera. A simple factory adjustment during assembly of the cut film back provides for an accurate positioning of the locating surface of the frame relative to the focal plane of the camera, while at the same time insuring a light-tight connection between the cut film back and the camera body when the former is attached to the camera. The ground glass is located in focusing position by means of the locating surface of the frame which is capable of being accurately adjusted, whereby proper location of the ground glass in the focal plane is assured when the ground glass is brought into focusing position. The particular resilient hinge and resilient catch for the ground glass support not only permits the ground glass to be swung to and from a focusing position wherein it is locked, but normally forces the ground glass support into engagement with said accurately positioned locating surface of the frame to insure the ground glass assuming the desired focal plane of the camera when in a focusing position.

Although I have shown and described certain specific embodiments of my invention, I am fully aware that many modifications thereof are possible. The present invention, therefore, is not to be restricted except insofar as is necessitated by the spirit of the appended claims.

Having thus described my invention, what I claim is new and desire to secure by Letters Patent of the United States is:

1. In a camera the combination with a camera body having an open back, an objective, and bearing surfaces in said camera body definitely spaced in accordance with the focal length of said objective, of a cut film back detachably connected to the back of said camera body in covering relation with the opening therein, and comprising a body portion adapted to engage said camera body in a light tight manner, a frame for positioning a cut film pack relative to the focal plane of the objective, a spacer member on said frame adapted to engage said bearing surfaces to definitely position the frame relative to the focal plane when the cut film back is placed on the camera body, means for adjustably connecting said frame to said body portion to permit a relative movement of the two parts along the optical axis, whereby said two parts can be adjusted relative to one another to insure said spacer member engaging said bearing surfaces and said body portion having a light tight engagement with said camera body, and means on said frame for holding a cut film pack in position against said frame.

2. In a camera the combination with a camera body having an open back, an objective, and bearing surfaces in said camera body definitely spaced in accordance with the focal length of said objective, of a cut film back detachably connected to the back of said camera body in covering relation with the opening therein, and comprising a body portion adapted to engage said camera body in a light tight manner, a frame for positioning a cut film holder relative to the focal plane of the objective, a spacer member on said frame adapted to engage said bearing surfaces to definitely position the frame relative to the focal plane when the cut film back is placed on the camera body, a plurality of adjustable members for connecting said frame to said body portion to permit an adjustment of said frame along the optical axis relative to said body portion while maintaining the plane of the frame perpendicular to the optical axis, whereby a light tight connection between the body portion and the frame can be provided when said spacer member engages said bearing surfaces, and guides on said frame for facilitating the positioning of a cut-film pack on said frame and for pressing the film pack against the locating surface of said frame.

3. In a camera the combination with a camera body having an open back, an objective, and bearing surfaces in said camera body definitely spaced in accordance with the focal length of said objective, of a cut film back detachably connected to the back of said camera body in covering relation with the opening therein, and comprising a body portion adapted to engage said camera body in a light tight manner, a frame on said body portion for positioning a cut film pack relative to the focal plane of the objective and including a locating surface against which the face of the film pack is adapted to be held, a spacer member on said frame adapted to engage said bearing surfaces to definitely position said locating surface relative to the focal plane when the adapter back is placed on the camera body, a ground glass support connected to one edge of said frame to move to and from a focusing position wherein it is superposed on the rear face of said frame, and ground glass in said support, a spacer element on the inner face of said ground glass support and adapted to engage said locating surface of said frame when the support is in its focusing position to definitely locate the ground glass in the focal plane of the camera, a resilient hinge between said ground glass support and said frame permitting movement of the support relative to the frame along the optical axis when the support is in focusing position, and normally forcing the support toward the frame whereby the spacer elements are normally held against said locating surface when the support is in focusing position, and a resilient latch for holding said support to said frame in focusing position.

4. In a camera the combination with a camera body having an open back, an objective, and bearing surfaces in said camera body definitely spaced in accordance with the focal length of said objective, of a cut film back detachably connected to the back of said camera body in covering relation with the opening therein, and comprising a body portion adapted to engage said camera body in a light tight manner, a frame on said body portion for positioning a cut film pack relative to the focal plane of the objective and including a locating surface against which the face of the film pack is adapted to be held, a spacer member on said frame adapted to engage said bearing surfaces to definitely position said locating surface relative to the focal plane when the cut film back is placed on the camera body, a ground glass support connected to one edge of said frame to move to and from a focusing position wherein it is superposed on the rear face of said frame, a ground glass in said support, a spacer element on the inner face of said ground glass support and adapted to engage said locating surface of said frame when the support is in its focusing position to definitely locate the ground glass in the focal plane of the camera, a separable resilient hinge for detachably connecting said support to one edge of said frame to permit the same to move to and from a focusing position relative to said frame and permitting movement of the support relative to the frame along the optical axis when the support is in focusing position, said hinge including a pair of apertured resilient hinge arms fixed at one end to said frame, the other end thereof capable of flexing along the optical axis, a pair of hinge pintles on said support adapted to extend through the apertures in said hinge arms, one of said pintles retractably mounted on said support to permit the same to be removed from engagement with said hinge arms, and a latch for holding said support to said frame in focussing position.

5. In a camera the combination with a camera body having an open back, an objective, and bearing surfaces in said camera body definitely spaced in accordance with the focal length of said objective, of a cut film adapter back detachably connected to the back of said camera body in covering relation with the opening therein, and comprising a body portion adapted to engage said camera body in a light tight manner, a frame on said body portion for positioning a cut film pack relative to the focal plane of the objective and including a locating surface against which the face of the film pack is adapted to be held, a spacer member on said frame adapted to engage said bearing surfaces to definitely position said locating surfaces relative to the focal plane when the adapter back is placed on the camera body, a ground glass support connected at one edge of said frame to move to and from a focusing position wherein it is superposed on the rear face of said frame, a ground glass in said support, a spacer element on the inner face of said ground glass support and adapted to engage said locating surface of said frame when the support is in its focusing position to definitely locate the ground glass in the focal plane of the camera, a separable resilient hinge for detachably connecting said support to one edge of said frame to permit the same to move to and from a focusing position relative to said frame and permitting movement of the support relative to the frame along the optical axis when the support is in focusing position, said hinge including a pair of apertured resilient hinge arms fixed at one end to said support, the other end thereof capable of flexing along the optical axis, a pair of hinge pintles on said frame adapted to extend through the apertures in said hinge arms, one of said pintles retractably mounted on said frame to permit the same to be removed from engagement with said hinge arms, a resilient latch for holding said support to said frame in focusing position, said latch including a latch element pivotally mounted on said support to engage a lug on said frame, the hinge pintle of said latch member supported by a spring which normally tends to move the latch member away from the frame when the support is in focusing position.

6. A cut film back capable of detachable connection to the back of a camera body in covering relation with an opening therein, which camera body includes an objective and bearing surfaces definitely spaced in accordance with the focal length of said objective, said back comprising a body portion adapted to engage said camera body in a light tight manner, a frame for positioning a cut film pack, a spacer member on said frame adapted to engage said bearing surfaces to definitely position the frame relative to the focal plane when the back is placed on the camera body, means for adjustably connecting said frame to said body portion to permit a relative movement of the two parts along the optical axis, whereby said two parts can be adjusted relative to one another to insure said spacer member engaging said bearing surfaces and said body portion having a light tight engagement with said camera body at the same time, and means on said frame for holding a cut film pack in position against said frame.

7. A cut film back capable of detachable connection to the back of a camera body in covering relation with an opening therein, which camera body includes an objective and bearing surfaces definitely spaced in accordance with the focal length of said objective, said back comprising a body portion adapted to engage said camera body in a light tight manner, a frame on said body portion for positioning a cut film pack and including a locating surface against which the face of the film pack is adapted to be held, a spacer member on said frame adapted to engage said bearing surfaces to definitely position the locating surface of the frame relative to the focal plane when the back is placed on the camera body, a ground glass support detachably connected at one edge of said frame to move to and from a focusing position wherein it is superposed on the rear face of said frame, a ground glass in said support, a spacer element on the inner face of said support and adapted to engage said locating surface of said frame when the support is in focusing position to definitely locate the ground glass in the focal plane of the objective, means for releasably holding said ground glass support in focusing position on said frame, the connection between said frame and support and said holding means being resilient to permit a limited movement of the support relative to said frame along the optical axis and adapted to force the support toward said frame to force the spacer element on the support against said locating surface on the frame.

8. A cut film back capable of detachable connection to the back of a camera body in covering relation with an opening therein, which camera body includes an objective and bearing surfaces definitely spaced in accordance with the focal length of said objective, said back comprising a body portion adapted to engage said camera body in a light tight manner, a frame for positioning a cut film pack and including a locating surface against which the face of the film pack is adapted to be held, a spacer member on said frame adapted to engage said bearing surfaces to definitely position the frame relative to the focal plane when the back is placed on the camera body, means for adjustably connecting said frame to said body portion to permit a relative movement of the two parts along the optical axis, whereby said two parts can be adjusted relative to one another to insure said spacer member engaging said bearing surfaces and said body portion having a light tight engagement with said camera body at the same time, a ground glass support connected at one edge of said frame to move to and from a focusing position wherein it is superposed on the rear face of said frame, a ground glass in said support, a spacer element on the inner face of said support and adapted to engage said locating surface of said frame when the support is in focusing position to definitely locate the ground glass in the focal plane of the objective, a hinge for connecting one edge of said support to said frame, a releasable latching means on the opposite edge of said support for holding the support in focusing position, said hinge and latching means being resilient to permit a limited movement of the support relative to said frame along the optical axis and adapted to resiliently force said support toward said frame to hold the spacer element on the support in engagement with the locating surface of said frame.

9. A cut film back capable of detachable connection to the back of a camera body in covering relation with an opening therein, which camera body includes an objective and bearing surfaces definitely spaced in accordance with the focal length of said objective, said cut film back comprising a body portion adapted to engage said camera body in a light tight manner, a frame for positioning a cut film holder and including a film pack locating surface, a spacer member on said frame adapted to engage said bearing surfaces to definitely position the frame relative to the focal plane when the back is placed on the camera body, means for adjustably connecting said frame to said body portion to permit a relative movement of the two parts along the optical axis, whereby said two parts can be adjusted relative to one another to insure said spacer member engaging said bearing surfaces and said body portion having a light tight engagement with said camera body at the same time, a ground glass support connected at one edge of said frame to move to and from a focusing position wherein it is superposed on the rear face of said frame, a ground glass in said support, a spacer element on the inner face of said support and adapted to engage said locating surface of said frame when the support is in focusing position to definitely locate the ground glass in the focal plane of the objective, a resilient hinge connecting one edge of said support to one edge of said frame, said hinge connection including spaced hinge arms fixed at one end to said support, the free end of each arm provided with an aperture and extending longitudinally of the support and capable of flexing in a direction parallel to the optical axis, and hinge pintles on said frame adapted to extend into the apertures in said hinge arms, whereby said hinge arms force said support toward said frame to hold the spacer element on the support in engagement with the locating surfaces of said frame.

10. A cut film back capable of detachable connection to the back of a camera body in covering relation with an opening therein, which camera body includes an objective and bearing surfaces definitely spaced in accordance with the focal length of said objective, said adapter back comprising a body portion adapted to engage said camera body in a light tight manner, a frame for positioning a cut film pack and including a locating surface for said film pack, a spacer member on said frame adapted to engage said bearing surfaces to definitely position the frame relative to the focal plane when the back is placed on the camera body, means for adjustably connecting said frame to said body portion to permit a relative movement of the two parts along the optical axis, whereby said two parts can be adjusted relative to one another to insure said spacer member engaging said bearing surfaces and said body portion having a light tight engagement with said camera body at the same time, a ground glass support connected at one edge of said frame to move to and from a focusing position wherein it is superposed on the rear face of said frame, a ground glass in said support, a spacer element on the inner face of said support and adapted to engage said locating surface of said frame when the support is in focusing position to definitely locate the ground glass in the focal plane of the objective, a resilient hinge connecting one edge of said support to one edge of said frame, said hinge connection including spaced hinge arms fixed at one end to said support, the free end of each arm provided with an aperture and extending longitudinally of the frame and capable of flexing in a direction parallel to the optical axis, and hinge pintles on said frame adapted to extend into the apertures in said hinge arms, a resilient latch for releasably holding said support in said focusing position, and including a latch member pivotally mounted on said support to engage a lug on the frame, means for resiliently mounting the pivot of said latch to the support, whereby the resilient hinge connection and the resilient latch mounting tend to force said support toward said frame to hold the spacer element on the support in engagement with the locating surface of said frame.

CHESTER W. CRUMRINE.